Jan. 7, 1947.  G. C. GEYER  2,414,037

AUTOMATIC BRAKE WEAR TAKE-UP MEANS

Filed July 6, 1945

INVENTOR.
George C. Geyer,
BY
Attorney

Patented Jan. 7, 1947

2,414,037

UNITED STATES PATENT OFFICE 2,414,037

AUTOMATIC BRAKE WEAR TAKE-UP MEANS

George C. Geyer, Hillside, N. J.

Application July 6, 1945, Serial No. 603,461

4 Claims. (Cl. 188—79.5)

This invention relates to improved automatic brake wear take-up means, and, more particularly, to novel means for such purpose which is especially well adapted for use in connection with the brakes of automotive vehicles.

The invention has for an object to provide a simple self-acting means operative to adjust the brake shoes of a brake mechanism toward the brake drum with which they cooperate, whereby to automatically compensate alterations of the throw of said brake shoes due to wear of the brake linings with which the operative faces thereof are equipped, and thereby constantly maintain a uniform predetermined clearance between the brake drum and brake shoes, when the latter are disposed in released relation to the former, thus preventing variation in the distance of throw of the brake shoes and the actuating means therefor, to the end that dependable and efficient braking action is constantly assured.

The invention has for a further object to provide a novel self-acting brake wear take-up means which can be easily applied to old as well as to new brake installations.

Another object of the invention is to provide a novel automatic brake wear take-up means comprising a yieldably contracted but telescopically expandible or extensible linkage arranged to extend between the pivoted brake shoes of a brake mechanism, and operative to provide stop means for the latter adapted to predetermine the released position thereof and thus the normal distance of throw thereof and of the actuating means therefor; said linkage including a spring actuated take-up cam for automatically expanding said linkage, whereby to adjust the disposition of said brake shoe stop means accordingly as wear of the brake shoe linings may require, and thereby to maintain a constantly uniform throw distance of said brake shoes and their actuating means.

Other objects of this invention, not at this time more particularly enumerated, will be understood from the following detailed description of the same.

Figure 1:
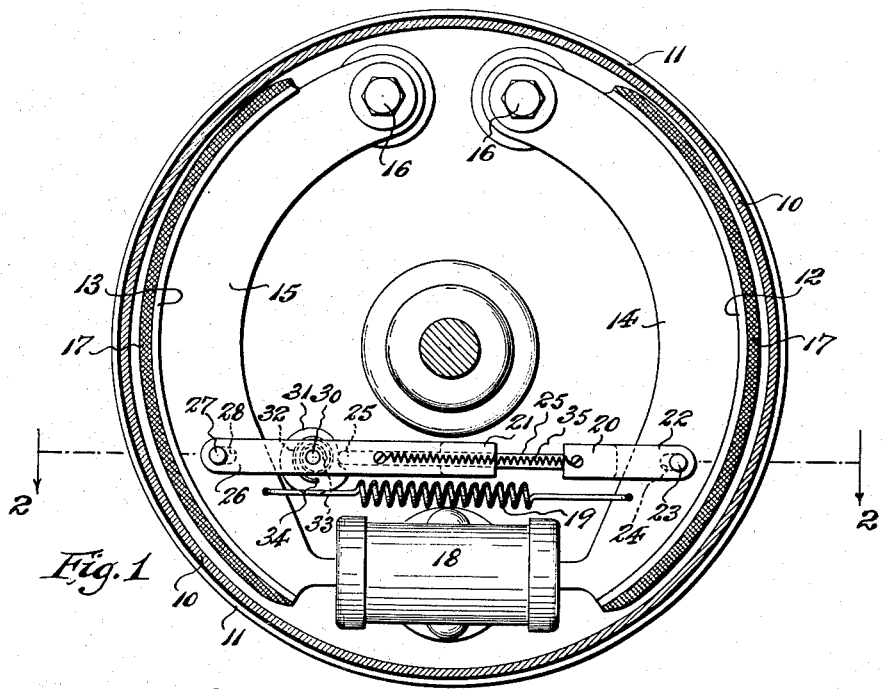
Figure 2:
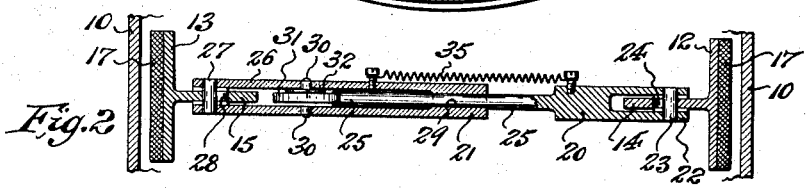
Figure 3:
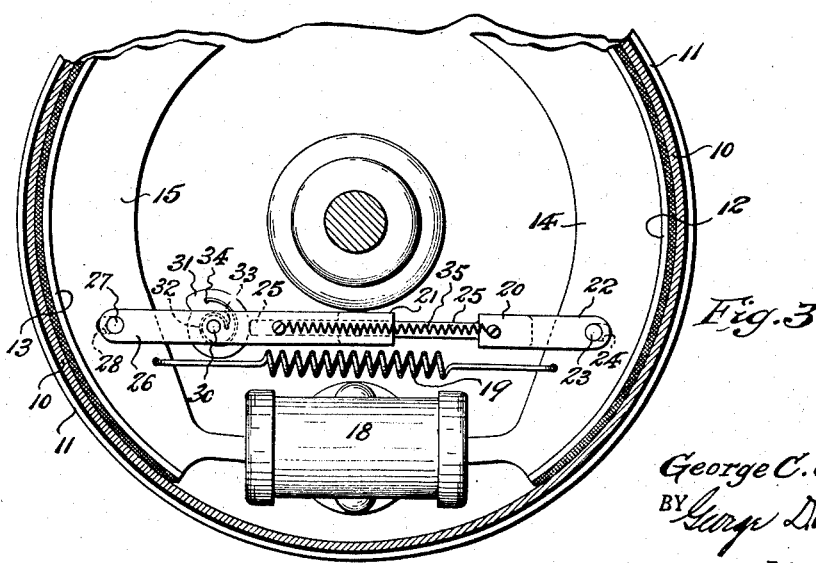

An illustrative embodiment of the invention is shown in the accompanying drawing, in which:

Fig. 1 is an elevational view of the interior structure of a brake mechanism equipped with the novel automatic brake wear take-up means according to this invention, parts being shown in section, and the brake-shoes being shown in normal initial released position; Fig. 2 is a fragmentary transverse sectional view, taken on line 2—2 in Fig. 1; and Fig. 3 is a fragmentary elevational view similar to that cf Fig. 1, but showing wear of the brake shoe linings, and showing the take-up means as operative to compensate for such wear, the brake shoes being shown as disposed in braking engagement with the brake drum.

Similar characters of reference are employed in the above described views, to indicate corresponding parts.

Referring to the drawing, the reference character 10 indicates the rotatable brake drum of the brake mechanism, and 11 indicates the stationary plate of said brake mechanism. Arranged within and opposed to the interior surface of the brake drum 10 are a pair of oppositely extending brake shoes 12 and 13, the same being respectively provided with webs or flanges 14 and 15. Said brake shoes are pivotally mounted upon said stationary plate 11 by means of pivoting studs 16 which engage the upper ends of said brake shoe flanges 14 and 15. Each brake shoe 12 and 13 is faced with a suitable brake lining material 17 adapted to frictionally engage the brake drum surfaces when the brake shoes are operatively thrust into engagement with the latter. Suitable means for throwing the brake shoes into operative engagement with the brake drum is mounted on the stationary plate 11 or suitably coupled for effective engagement with the free ends of said brake shoe webs or flanges 14 and 15. Said operating means may be of any well known type, but is illustratively shown in the drawing as comprising a hydraulic cylinder and piston operator 18, associated pull spring means 19 being connected between said brake shoe webs or flanges to yieldably retract and hold the brake shoes in normal initial released positions.

The means for automatically taking up wear of the brake shoe linings 17, and thus stabilizing the throw of brake shoes and the actuating means for the latter, according to this invention, is provided by an expandible or extensible stop linkage which is connected with the brake shoes so as to extend therebetween. This linkage comprises relatively movable, telescopically related, link bars 20 and 21. The link bar 20 is provided with a bifurcate or forked outer end portion 22 which straddles the web or flange of one brake shoe, e. g. the web or flange 14 of the brake shoe 12. Fixed in and across the bifurcate or forked end portion 22 of said link bar 20 is a stop pin 23 which extends through a slot or enlarged opening 24 in said brake shoe web or flange 14, whereby sufficient play or movement is allowed between said stop pin and brake shoe web or flange to permit the brake shoe 12 to freely move from and to brake released position. Extending axially from the inner end of said link bar 20 is a slide rod 25. The link bar 21 is also provided with a bifurcate or forked outer end portion 26 which straddles the web or flange of the other brake shoe, e. g. the web or flange 15 of the opposite brake shoe 13. Fixed in and across the bifurcate or forked end portion 26 of said link bar 21 is a stop pin 27 which extends through a slot or enlarged opening 28 in said brake shoe flange 15, whereby sufficient play or movement is allowed between said stop pin 27 and brake shoe web or flange 15 to permit the brake shoe 13 to freely move from and to brake released position. The inner end portion of said link bar 21 is provided with an axial bore 29 which communicates with the interior of the bifurcate or forked end portion of said link bar. The slide rod 25 of the link bar 20 enters the interior of the bifurcate or forked end portion of the link bar 21 through said bore 29, thereby telescopically connecting said link bars 20 and 21 subject to relative sliding movement.

Rotatably mounted within the interior of the bifurcate or forked end portion 26 of the link bar 21, by its trunnions 30 which are respectively journaled in the sides or arms of said bifurcate or forked end portion 26, is a take-up cam 31. The periphery of said take-up cam is opposed to the free end of said slide rod 25 so as to be abutted thereby, whereby to resist contractive telescopic relative movement of the link bars 20 and 21. A torsional spring 32 is provided for rotating the take-up cam 31; one end 33 of said spring being anchored or affixed to a side arm of said bifurcate or forked end portion 26 and the other end 34 of said spring being anchored or affixed to the body of said take-up cam 31. Said spring 32 functions to rotate the cam in clockwise direction. Initially the cam 31 is set to engage the end of the slide rod 25 at substantially the point of its minimum radius, whereby the spring rotates the cam to progressively oppose points of increasing radius to said slide rod, to thereby cause progressive longitudinal expansion or extension of the stop linkage formed by the link bars 20 and 21 and their stop pins 23 and 27. Pull spring means 35 is interconnected with and between the link bars 20 and 21, whereby to yieldably contract the linkage so as to maintain the take-up cam 31 in operative engagement with the end of the slide rod 25.

In the operation of the expandible or extensible stop linkage, as the brake linings 17 wear, the amplitude of brake shoe movement from released to brake drum engaging position will increase proportionately to the amount of such wear. When wear occurs, the required increased forward swinging movements of the brake shoes, necessary to operatively engage the brake shoes and their linings with the brake drum, will carry the rear ends or sides of the slots or openings 24 and 28 respectively into abutment against the stop pins 23 and 27, thereby exerting an outward pull upon the respective link bars 20 and 21 of the stop linkage, which operates to telescopically expand or extend the latter. When the stop linkage is thus expanded or extended, it tends to separate the take-up cam 31 from the extremity of the slide rod 25. As such separation occurs, the tension of the torsion spring 32 operates to rotate the take-up cam 31 so as to interpose between its axis and the end of the slide rod 25 an increased radial extent of said cam, whereby to hold the link bars 20 and 21 in the telescopically extended or expanded relation which repositions the stop pins 23 and 27 in an advanced position equal to the amount of brake lining wear required to be compensated so as to reduce the throw of the brake shoes to normal initial amplitude. Thereafter, when the brake shoes are released, they will swing back, under the pull of the spring 19, until forward ends or sides of the slots or openings 24 and 28 abut the repositioned stop pins 23 and 27, thus arresting rearward swinging movement so that the clearance between the worn brake shoe linings and brake drum is equal to the predetermined initial clearance provided between said parts in their original condition.

Such automatic self-adjustment of the brake shoe mechanism in compensation of brake shoe lining wear will progressively continue until said linings have worn down to the point where replacement thereof is mandatory.

Having now described my invention, I claim:

1. In a brake mechanism having a brake drum, a pair of brake shoes opposed to said drum, and means to move said shoes into and out of engagement with said drum, automatic brake wear take-up means provided by a longitudinally extensible stop linkage connected with said shoes to extend therebetween, said stop linkage comprising relatively longitudinally movable link bars respectively having lost motion connection with the respective brake shoes whereby to permit normal movements of the latter toward and from the drum, means to yieldably contract said link bars, and a single spring rotated take-up cam rotatably mounted on one link bar to oppose and constantly engage the free end of the other link bar for the purposes described.

2. In a brake mechanism having a brake drum, a pair of pivoted brake shoes opposed to said drum, and means to move said shoes into and out of engagement with said drum, automatic brake wear take-up means provided by a longitudinally extensible stop linkage extending between said shoes, said stop linkage comprising relatively longitudinally movable link bars, stop pin and slot connections respectively coupling outer ends of said link bars with the respective brake shoes, whereby to permit normal movements of the latter toward and from the drum means to yieldably contract said link bars, and a single spring rotated take-up cam rotatably mounted on one link bar to oppose and constantly engage the inner end of the other link bar for the purposes described.

3. In a brake mechanism having a brake drum, a pair of pivoted brake shoes opposed to said drum, and means to move said shoes into and out of engagement with said drum, automatic brake wear take-up means provided by a longitudinally extensible stop linkage extending between said shoes, said stop linkage comprising relatively longitudinally movable link bars having slidably engaged inner end parts, each link bar having a bifurcate outer end portion adapted to straddle the web of a brake shoe to which it is to be connected, stop pin and slot connections for respectively coupling said bifurcated outer end portions of said link bars with the respective brake shoe webs whereby to permit normal movements of the brake shoes toward and from the drum, means to yieldably contract said link bars, and a single spring rotated take-up cam rotatably mounted on one link bar to oppose and constantly engage the inner end of the other link bar for the purposes described.

4. In a brake mechanism having a brake drum, a pair of pivoted brake shoes opposed to said drum, and means to move said shoes into and out of engagement with said drum, automatic brake wear take-up means provided by longitudinally extensible stop linkage extending between said shoes, said stop linkage comprising relatively longitudinally movable link bars having telescopically engaged male and female inner end parts, a single spring rotated take-up cam rotatably supported on the one link behind its female end part whereby to abut the extremity of the male end part of the other link, a pull spring interconnected between said links whereby to maintain constant engagement of said take-up cam of the one link with said extremity of the male end part of the other link, each link bar having a bifurcate outer end portion adapted to straddle the web of a brake shoe to which it is connected, and stop pin and slot connections for respectively coupling said bifurcated outer end portions of said link bars with the respective brake shoe webs, whereby to permit normal movements of the brake shoes toward and from the drum.

GEORGE C. GEYER.